United States Patent
Moore (10) Patent No.: US 8,994,780 B2
(45) Date of Patent: Mar. 31, 2015

(54) VIDEO CONFERENCING ENHANCED WITH 3-D PERSPECTIVE CONTROL

(71) Applicant: MCCI Corporation, Ithaca, NY (US)

(72) Inventor: Terrill M. Moore, Trumansburg, NY (US)

(73) Assignee: MCCI Corporation, Ithaca, NY (US)

( * ) Notice: Subject to any disclaimer, the term of this patent is extended or adjusted under 35 U.S.C. 154(b) by 166 days.

(21) Appl. No.: 13/645,049

(22) Filed: Oct. 4, 2012

(65) Prior Publication Data

US 2014/0098179 A1 Apr. 10, 2014

(51) Int. Cl.
*H04N 7/14* (2006.01)
*H04N 7/15* (2006.01)
*H04N 13/00* (2006.01)
*H04N 13/02* (2006.01)
*H04N 13/04* (2006.01)

(52) U.S. Cl.
CPC ....... *H04N 13/0014* (2013.01); *H04N 13/0048* (2013.01); *H04N 13/0059* (2013.01); *H04N 13/0239* (2013.01); *H04N 13/0402* (2013.01); *H04N 13/047* (2013.01)
USPC .................... 348/14.08; 348/14.07; 348/14.16

(58) Field of Classification Search
USPC ............ 348/14.07, 14.08, 14.1, 14.12, 14.16, 348/54
See application file for complete search history.

(56) References Cited

U.S. PATENT DOCUMENTS

| | | | |
|---|---|---|---|
| 5,359,362 A | | 10/1994 | Lewis et al. |
| 6,771,303 B2 * | | 8/2004 | Zhang et al. ............... 348/14.16 |
| 6,806,898 B1 * | | 10/2004 | Toyama et al. ............ 348/14.16 |
| 7,515,174 B1 | | 4/2009 | Francisco et al. |
| 7,570,803 B2 | | 8/2009 | Criminisi et al. |
| 8,659,637 B2 * | | 2/2014 | De Beer et al. ............. 348/14.08 |
| 8,797,377 B2 * | | 8/2014 | Mauchly et al. ........... 348/14.08 |
| 2007/0159523 A1 | | 7/2007 | Hillis et al. |
| 2007/0171275 A1 * | | 7/2007 | Kenoyer .................... 348/14.08 |
| 2007/0279483 A1 * | | 12/2007 | Beers et al. ................. 348/14.08 |
| 2010/0277576 A1 * | | 11/2010 | Fattal et al. ..................... 348/54 |
| 2011/0267348 A1 | | 11/2011 | Lin et al. |
| 2012/0075432 A1 | | 3/2012 | Bilbrey et al. |
| 2012/0147149 A1 * | | 6/2012 | Liu et al. .......................... 348/50 |
| 2012/0327174 A1 * | | 12/2012 | Hines et al. ................ 348/14.07 |

OTHER PUBLICATIONS

Pollefeys, Marc, et al., "Visual Modeling with a Hand-Held Camera," International Journal of Computer Vision, vol. 59, Issue 3, Sep.-Oct. 2004, pp. 1-52.

(Continued)

*Primary Examiner* — Binh Tieu
(74) *Attorney, Agent, or Firm* — Cesari and McKenna, LLP (57) ABSTRACT

In one embodiment, images of a first user in a video conference are captured with one or more physical video cameras. The captured images are processed to form a three-dimensional (3-D) model of the first user. A location on a display screen is determined where an image of each of one or more second users in the video conference is shown. One or more virtual cameras are positioned in 3-D space. Each virtual camera is associated with a respective second user and positioned in 3-D space based on the location on the display screen where the image of the associated second user is shown. A view of the first user from the perspective of each of the one or more virtual cameras is rendered. The rendered view of the first user from the perspective of each virtual camera is shared with the associated second user for the respective virtual camera.

19 Claims, 6 Drawing Sheets

(56) References Cited

OTHER PUBLICATIONS

Pollefeys, M., et al., "Hand-Held Acquisition of 3D Models with a Video Camera," Second International Conference on 3-D Digital Imaging and Modeling, 1999, Proceedings, Oct. 4-8, 1999, pp. 1-10.
Szeliski, Richard, "Stereo Algorithms and Representations for Image-Based Rendering," 10th British Machine Vision Conference (BMVC'99), 1999, pp. 314-328.
Atzpadin, Nicole, et al., "Stereo Analysis by Hybrid Recursive Matching for Real-Time Immersive Video Conferencing," IEEE Transactions on Circuits and Systems for Video Technology. IEEE Service Center, Piscataway, NJ, US, vol. 14, No. 3, Mar. 1, 2004, pp. 321-334.
Isgro, Francesco, et al., "Three-Dimensional Image Processing in the Future of Immersive Media," IEEE Transactions on Circuits and Systems for Video Technology. IEEE Service Center, Piscataway, NJ, US, vol. 14. No. 3, Mar. 1, 2004, pp. 288-303.
Kauff, Peter, et al. "An Immersive 3D Video-Conferencing System Using Shared Virtual Team User Environments," Proceedings of the 4th International Conference in Collaborative Virtual Environments, CVE 2002, Bonn, Germany, ACM, Sep. 30-Oct. 2, 2002, pp. 105-112.
Notification of Transmittal of the International Search Report and the Written Opinion of the International Searching Authority, or the Declaration, International Filing Date: Oct. 1, 2013, International Application No. PCT/US2013/062820, Applicant: MCCI Corporation, Date of Mailing: Jan. 2, 2014, pp. 1-11.
Schreer, O., et al., "3DPresence—A System Concept for Multi-User and Multi-Party Immersive 3D Videoconferencing," IET Conference Publications, IET 5th European Conference on Visual Media Production, Nov. 26, 2008, pp. 1-8.

* cited by examiner

VIDEO CONFERENCING ENHANCED WITH 3-D PERSPECTIVE CONTROL

BACKGROUND

1. Technical Field of the Invention

The present disclosure relates to video conferencing and more specifically to techniques for improving the views seen by users during video conferences.

2. Background Information

Inexpensive video cameras (e.g., webcams) are now integrated into, or are available as an accessory for, most computing systems used in the home or office. Further, inexpensive video conferencing software is widely available. However, video conferencing still has not achieved the user-adoption rate pundits originally forecast. Many users still rely on telephone communication, of arrange for a face-to-face meeting, for situations that could potentially be handled with a video conference. The present video conferencing experience provided using inexpensive video cameras (e.g., webcams) is simply not compelling for many users.

One reason why users may find the present video conferencing experience uncompelling is that it is often difficult to establish meaningful rapport among users. This may be caused by a number of factors. One factor is that users are often prevented from maintain eye contact with one another. Another factor is that the views shown of users may be unflattering.

The inability of users to maintain eye contact may stem from the placement of the inexpensive video cameras (e.g., webcams). With many computing systems, a video camera (e.g., webcam) is physically offset from the display screen of the computing system, positioned, for instance, to the side of the display screen, or on top of the display screen. The offset may stem from the simple fact that, if centered in front of the display screen, the video camera would block a user's view of the display screen, and if centered behind the display screen, the opaque display screen would block the view of the camera.

As a result of the offset, when a first user looks directly at a portion of the video display screen showing an image of the second user during a video conference, the video camera does not capture images of the first user head-on. Instead, the video camera captures an image of the first user from an angle. For example, if the video camera is positioned to the side of the display screen, an angular view showing the side of the first user's face may be captured. The closer the video camera is to the first user, the more pronounced this effect will be. Accordingly, when the captured image of the first user is shown to the second user in the view conference, it will appear to the second user that the first user is looking askew of the second user, rather than into the eyes of the second user. If the first user tries to compensate, and instead of looking at the portion of the video display screen showing the image of the second user, looks directly into the video camera, eye contact is still lost. The second user may now see the first user looking directly towards them, however the first user is no longer looking directly towards the second user, and he or she now suffers the lack of eye contact.

Further, the images captured of users by inexpensive video cameras (e.g., webcams) may be highly unflattering. Such video cameras typically employ wide-angle lenses that have a focal length that is roughly equivalent to a 20 millimeter (mm) to 30 mm lens on a traditional 35 mm camera. Such video cameras are also typically positioned close to the user, typically no more than a couple of feet away. It is commonly known that 20-30 mm equivalent lens, at such close distances, do not capture images of the human face that are visually pleasing. Instead, they impart a "fisheye effect", causing the nose to appear overly large, and the ears to appear too small. While the user may be recognizable, they do not appear as they do in real life.

These limitations may be difficult to overcome in inexpensive video conferencing systems that employ inexpensive video cameras (e.g., webcams). Even if one were able to create a transparent spot in the display screen, such that a video camera could be mounted behind the screen and see through it, problems would still persist. Many video conferences have several participants, and such a physical solution would not readily support such configurations. Further, in order to address the above discussed problems of unflattering views, the video camera would have to be physically mounted at a distance that is typically greater than a comfortable viewing distance of the display screen, so that a more pleasing focal length image sensor could be used. However, this may not be practical given space constraints in offices and home (or, for example, in a mobile setting when a user is traveling).

Improved techniques are needed for conducting video conferences that may address some or all of the shortcomings described above, while satisfying practical constraints.

SUMMARY

In one or more embodiment, one or more virtual cameras associated with second users may be employed in a video conference to enable a first user to maintain eye contact with the second users and/or to provide a more flattering view of the first user. Each virtual camera may be positioned in three-dimensional (3-D) space based on a location on a display screen where an image of an associated second user is shown.

More specifically, in one or more embodiments, one or more physical video cameras (e.g., webcams) may be positioned offset to the display screen of a computing device of the first user. The physical video cameras (e.g., webcams) capture images of the first user in the video conference and his or her surroundings. The images include depth information that indicates the depth of features in the images. The images and depth information are processed to form a three-dimensional (3-D) model of the first user and his or her surroundings. From the 3-D model and images of the first user, a two-dimensional (2-D) (or in some implementations a 3-D) view of the first user is rendered from the perspective of each of the one or more virtual cameras. Each virtual camera is associated with a second user participating in the video conference, and is positioned in 3-D space based on a location on the display screen where an image of the associated second user is shown. For example, each virtual camera may be positioned at a point along a line that extends through the image of the associated second user on the display screen and a location associated with the first user. The point on each line at which the respective virtual camera is located may be chosen to be more remote from the first user than the physical video camera(s) (e.g., webcams), for instance, located behind the display screen. By rendering an image of the first user from such a distance, a more pleasing depiction of the first user may be generated by replication of a mild telephoto effect. The rendered 2-D (or in some implementations 3-D) view of the first user from the perspective of each virtual camera is shared with the associated second user for the respective virtual camera. When the first user looks to the image of a particular second user on the display screen, that second user will see a "head-on" view of the first user and his or her eyes. In such manner, eye contact is provided to the second user that the first user is looking at. As the attention of first user shifts among second users (if there are multiple ones in the video conference), different second users may see the "head-on" view, as occurs in a typical "face-to-face" meeting as a user's attention shifts among parties.

BRIEF DESCRIPTION OF THE DRAWINGS

The detailed description below refers to the accompanying drawings, of which.

DETAILED DESCRIPTION OF AN ILLUSTRATIVE EMBODIMENT

Figure 1:
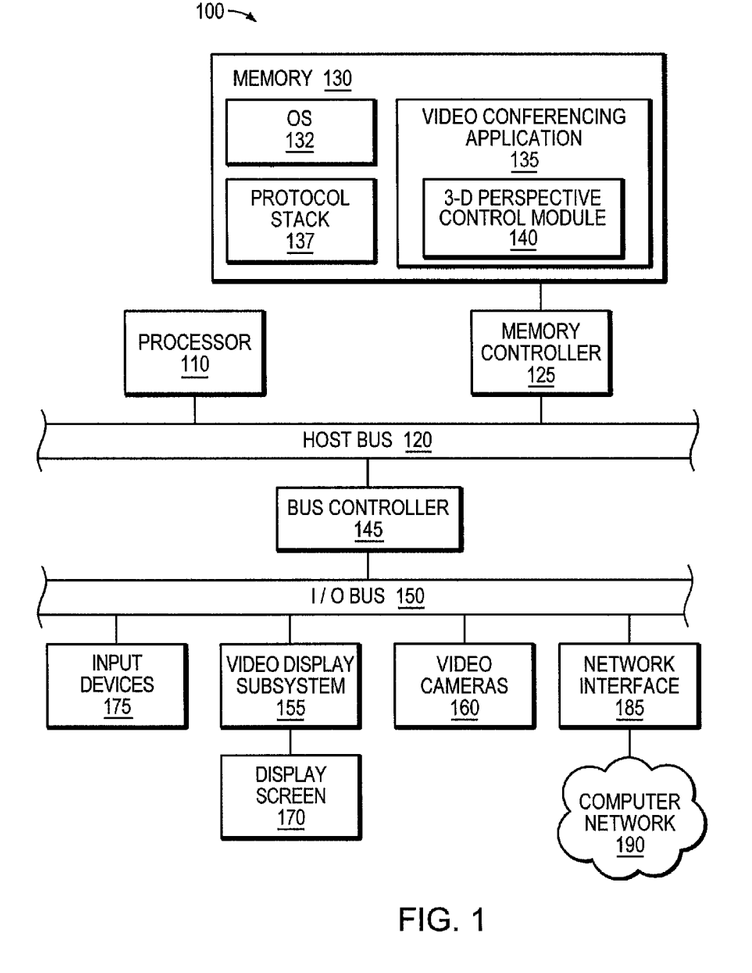
FIG. 1 is a block diagram of an example computing system, in which at least some of the presently described techniques may be employed.

FIG. 1 is a block diagram of an example computing system 100, in which at least some of the presently described techniques may be employed. The computing system 100 may be a generally stationary system, for example, a desktop computer. Alternatively, the computing system 100 may be a portable device, for example, of a notebook computer, a tablet computer, a smartphone, a media player, or other type of mobile device that may be readily transported. The computing device 100 may include at least one processor 110 coupled to a host bus 120. The processor 110 may be any of a variety of commercially available processors, such as an Intel x86 processor, or another type of processor. A memory 130, such as a Random Access Memory (RAM), is coupled to the host bus 120 via a memory controller 125. In one implementation, the memory 130 may be configured to store computer-executable instructions and data. However, it should be understood that in alternative implementations multiple memories may be employed, for example according to a Harvard architecture or Modified Harvard architecture, with one memory designated for instruction storage and a separate memory designated for data storage.

The instructions and data may be for an operating system (OS) 132. In addition, instructions and data may be fore a video conferencing application 135 and a protocol stack 137. A 3-D perspective control module 140 may be provided as a portion of the video conferencing application 135. Alternatively, the 3-D perspective control module 140 may take the form of a stand-alone application or driver, which interoperates with the video conferencing application 135. As discussed in detail below, the 3-D perspective control module 140 may implement one or more virtual cameras that enable a first user of the computing system 100 to maintain eye contact with one or more other users of a video conference and/or provide a more flattering view of the first user to the one or more other users of the video conference.

The host bus 120 of the computing system 100 is coupled to an input/output (I/O) bus 150 through a bus controller 145. A persistent storage device 180, such as a hard disk drive, a solid-state drive, or another type or persistent data store, is coupled to the I/O bus 150, and may persistently store computer-executable instructions and data related to the operating system 132, the video conferencing application 135, the protocol stack 137, and the 3-D perspective control module 140, and the like, that are loaded into the memory 130 when needed. One or more input devices 175, such as a touch sensor, a touchpad, a keyboard, a mouse, a trackball, etc. may be provided to enable the first user to interact with the computing system 100 and the applications running thereon. Further, a network interface 185 (e.g., a wireless interface or a wired interface) may be provided to couple the computing device to a computer network 180, such as the Internet. The network interface 185, in conjunction with the protocol stack 137, may support communication between applications running on the computing system 100 and remote applications running on other computing systems, for example, between the video conferencing application 135 and similar video conferencing applications used by second users on other computing systems.

A video display subsystem 155 that includes a display screen 170 is coupled to the I/O bus 150, for display of images to the first user. The display screen 170 may be physically integrated with the rest of the computing system 100, or provided as a separate component. For example, if the computing system 100 is a tablet computer, the display screen 170 may be physically integrated into the front face of the tablet. Alternatively, if the computing system 100 is a desktop computer, the display screen 170 may take the form of a standalone monitor, coupled to the rest of the computing system 100 by a cable.

One or more physical video cameras 160 (e.g., webcams) are also coupled to the I/O bus 150. Depending on the implementation, the video cameras may be coupled to the bus using any of a variety of communications technologies, for example, Universal Serial Bus (USB), Mobile Industry Processor Interface (MIPI), Camera Serial Interface (CSI), WiFi, etc. The one or more physical video cameras 160 may be physically integrated with the rest of the computing system 100. For example, if the computing system 100 is a tablet computer, the one or more physical video cameras 160 may be physically integrated into the front face of the tablet. Alternatively, the one or more physical video cameras 160 may be physically integrated into a standalone subcomponent of the computing system 100. For example, if the computing system 100 uses a standalone monitor, the one or more physical video cameras 160 may be integrated into the bezel of the monitor. In still other alternatives, the one or more physical video cameras 160 may be entirely separate components, for example, standalone video cameras positioned by a user in a desired manner.

While images captured by the one or more physical video cameras 160 may be directly shared with one or more second users of a video conference conducted using the video conferencing application 135, as discussed above the experience may be uncompelling. An inability to establish eye contact and capture of unflattering views may make it difficult to establish meaningful rapport among the users.

In one embodiment, one or more virtual cameras may be employed in a video conference to enable a first user to maintain eye contact with one or more second users and/or to provide more flattering views of the first user. Each virtual camera may be positioned in 3-D space based on a location on a display screen where an image of an associated second user is shown.

Figure 2:
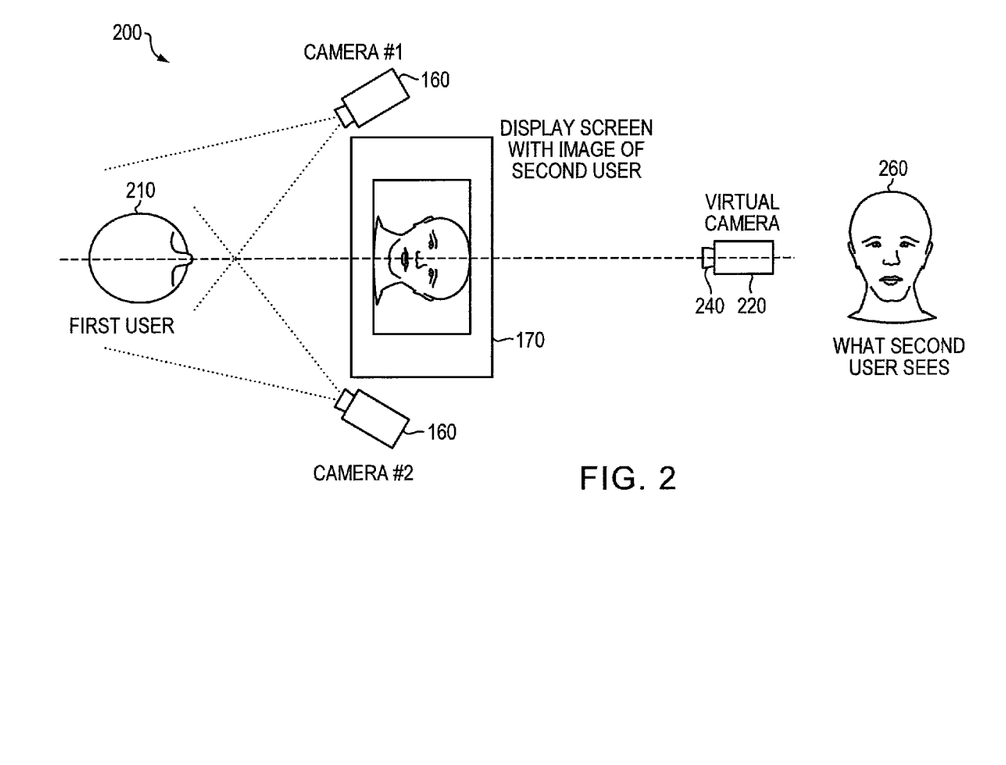
FIG. 2 is a schematic diagram of an example user-to-user video conference, illustrating the use of a virtual camera associated with a second user.

FIG. 2 is a schematic diagram 200 of an example user-to-user video conference, illustrating the use of a virtual camera associated with a second user. In one embodiment, two physical video cameras (e.g., webcams) 160 are positioned at known locations, for instance, to either side of the display screen 170, and capture images of the first user 210 and his or her surroundings. The images from the two physical video cameras (e.g., webcams) 160 may include sufficient depth information so that the 3-D perspective control module 140, through the application of range imaging techniques, can readily determine the depth of features in the images. For example, the two video cameras (e.g., webcams) 160 may capture stereoscopic images of the first user 210, and imaging techniques may include stereo triangulation to determine depth of features in the images.

In other embodiments (not shown), a single specially configured video camera (e.g., webcam) may capture images of the first user 210 that include sufficient depth information to determine the depth of features in the images. For instance, the single video camera may include a Foveon-style image sensor, and focus may be varied to collect depth information. Alternatively, the single video camera may include lenses with chromatic aberration, and multiple layers of image sensors may be employed to capture depth information.

In still other embodiments, additional video cameras (not shown), beyond the one or two discussed above, may be employed that capture redundant or supplemental image and depth information. For example, additional video cameras may be mounted above and below the display screen 170, to capture areas of the user's face that may be otherwise hidden.

The images and depth information may be processed by a model generation algorithm of the 3-D perspective control module 140 to form a 3-D model of the first user and his or her surroundings. The model generation algorithm may include a facial recognition routine to determine the approximate location of the face of the first user within the environment. The model generation algorithm may be applied to each video frame to generate a new model each time a frame is captured (e.g., 30 frames per second), or may be applied periodically, at some multiple of video frame captures, since in normal video conferencing situations user movement is generally limited.

From the 3-D model and images of the first user, the 3-D perspective control module 140 renders a two-dimensional (or in some implementations a 3-D) view of the first user from the perspective of a virtual camera 220 associated with the second user. The virtual camera is positioned in 3-D space based on a location on the display screen 170 where an image 230 of the second user is shown. For example, the virtual camera 220 may be positioned at a point along a line 250 that extends through the image 230 of the second user on the display screen 170 and a location associated with the first user 210. The location of the image 230 of the second user 170 may be provided to the 3-D perspective control module 140 as x-axis and y-axis coordinates from a windowing system of the video conferencing application 135. In some implementations, the center of the image 230 of the second user 170 may be utilized. In alternative implementations, a facial recognition routine may be used to determine the approximate location of the face (or more specifically, the eyes) of the second user within the image 230, and the line caused to extend through the image about the center of the second user's face (or, more specifically a spot between their eyes).

Likewise, the location of the first user 210 may be approximated based on the location of the physical video cameras (e.g., webcams) 160, display screen 170, and/or user entered parameters. Alternatively, the location associated the first user 210 may be determined more precisely from the 3-D model of the first user and his or her surroundings. A facial recognition routine may be used to differentiate the face of the first user from background objects, and the center of the first user's face (or more specifically, a spot between the first user's eyes) may be used for the line 250.

The point 240 at which the virtual camera 230 is located may be chosen as anywhere along the line 250, in some cases, limited by the pixel information available from the physical video cameras (e.g., webcams) 160 and the processing power of the computing system 100. In one embodiment, the point 240 may be chosen to be more remote from the first user than the physical video cameras (e.g., webcams) 160, such that it is behind the display screen 170. By rendering a 2-D (or in some implementations a 3-D) view of the first user from such a distance, a "flatter" field that simulates a telephoto lens may be produced, leading to a more pleasing depiction of the first user than obtainable directly from the wide-angle short-focal-length physical video cameras (e.g., webcams) 160.

The rendered 2-D (or in some implementations 3-D) view of the first user 210 is shared with the second user so that the that second user will see a "head-on" view 260 of the first user 210 and his or her eyes, when the first user looks at the image 230 of the second user on the display screen 170. In such manner, eye contact may be provided to the second user, even though the physical video cameras (e.g., webcams) 160 are located offset from the line of sight of the first user 210.

Figure 3:
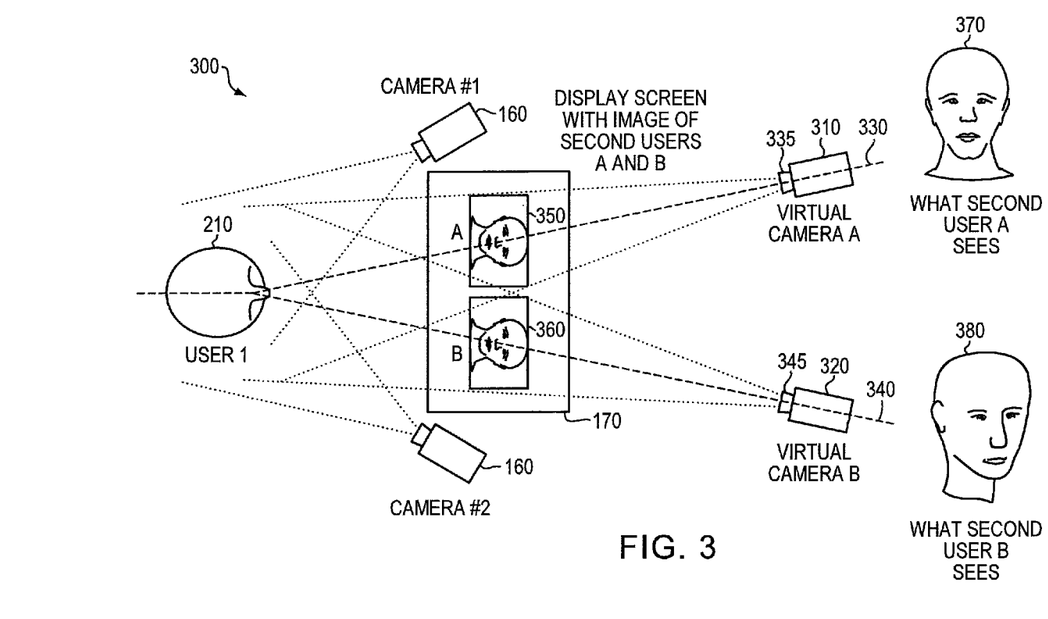
FIG. 3 is a first schematic diagram of an example multi-user video conference, illustrating the use of a virtual camera associated with each of two second users (second user A and second user B)

Similar techniques may be employed in a multi-user video conference, where there are two or more second users. FIG. 3 is a first schematic diagram 300 of an example multi-user video conference, illustrating the use of a virtual camera associated with each of two second users (second user A and second user B). As with the user-to-user configuration in FIG. 2, images and depth information are captured, and a 3-D model of the first user and his or her surroundings is formed. However, rather than employ a single virtual camera, multiple virtual cameras 310, 320 may be employed, each virtual camera associated with a respective second user. For example, virtual camera A 310 may be associated with second user A, and virtual camera B 320 may be associated with second user B. Additional virtual cameras may be provided for additional second users.

From the 3-D model and images of the first user, the 3-D perspective control module 140 renders a two-dimensional (or in some implementations a 3-D) view of the first user from the perspective of each of the virtual cameras 310, 320. As in the user-to-user configuration discussed in relation to FIG. 2, each virtual camera 310, 320 in FIG. 3 is positioned in 3-D space based on a location on the display screen 170 where an image 350, 360 of the respective second user is shown. For example, virtual camera A 210 may be positioned at a point 335 along a line 330 that extends through the image 350 of the second user A on the display screen 170 to a location associated the first user 210. Likewise, virtual camera A 320 may be positioned at a point 345 along a line 340 that extends through the image 360 of the second user B on the display screen 170 to a location associated with the first user 210. As above, the center of the images 350, 360, an approximate location of the face (or more specifically, the eyes) within the images 350, 360, or some other point associated with the images 350, 360 may be used to define one end of each line 330, 340. Likewise, an approximated location of the first user, a more precise location of the face (or more specifically, point between the eyes of the first user) derived from the 3-D model, or some other location associated with the first user, may be used to define the other end of each line 330, 340.

An individually rendered 2-D (or in some implementations 3-D) view of the first user 210 is shared with each second user. As shown in FIG. 3, when the first user 210 looks at the image 350 of second user A on the display screen 170, the 3-D perspective control module 140 will render a view of the first user from virtual camera A 310 so that second user A will see a "head-on" view 370 of the first user 210 and his or her eyes. The 3-D perspective control module 140 will render a view from virtual camera B 320 so that second user B will see a view 380 in which it appears that the first user is looking "off to the side".

Figure 4:
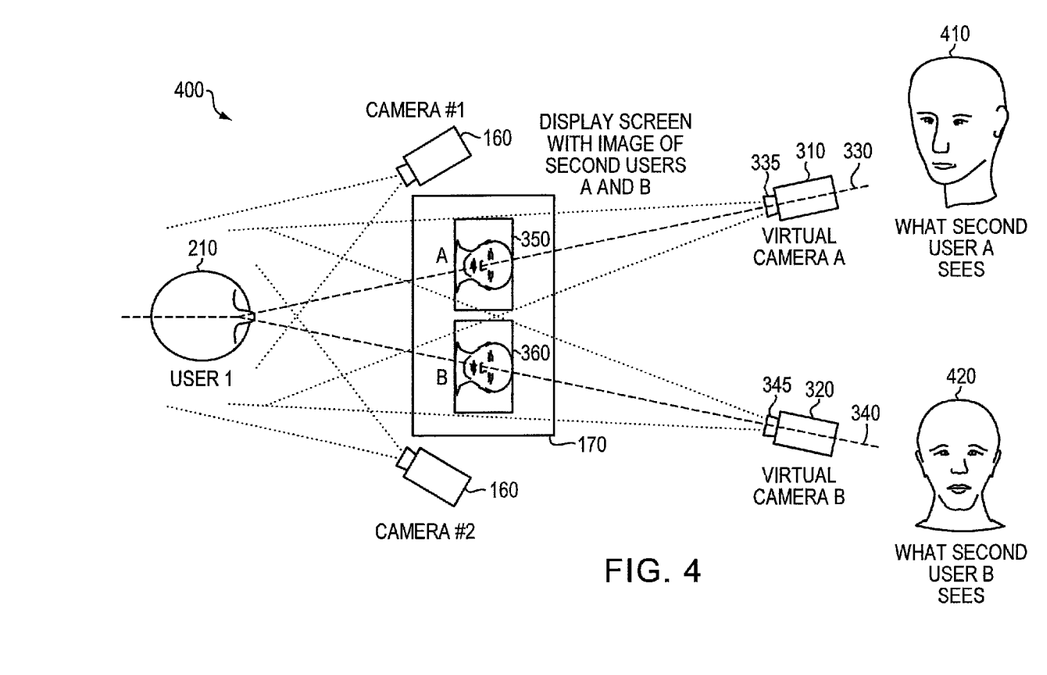
FIG. 4 is a second schematic diagram of an example multi-user video conference, illustrating the effects of a shift of focus by the first user.

As in a "face-to face" conversation, as the first user's attention shifts among the second users, for example, in the course of conversation with each of them, the views shown will be updated and eye contact changed. FIG. 4 is a second schematic diagram 400 of an example multi-user video conference, illustrating the effects of a shift of focus by the first user. As shown in FIG. 4, when the first user 210 changes focus to look at the image 360 of second user B, the 3-D perspective control module 140 will render a view of the first user from virtual camera B 320 so that second user B will now see a "head-on" view 420. Likewise, the 3-D perspective control module 140 will render a view from virtual camera A 310 so that second user A will see a view 410 in which it appears that the first user is looking "off to the side".

Figure 5:
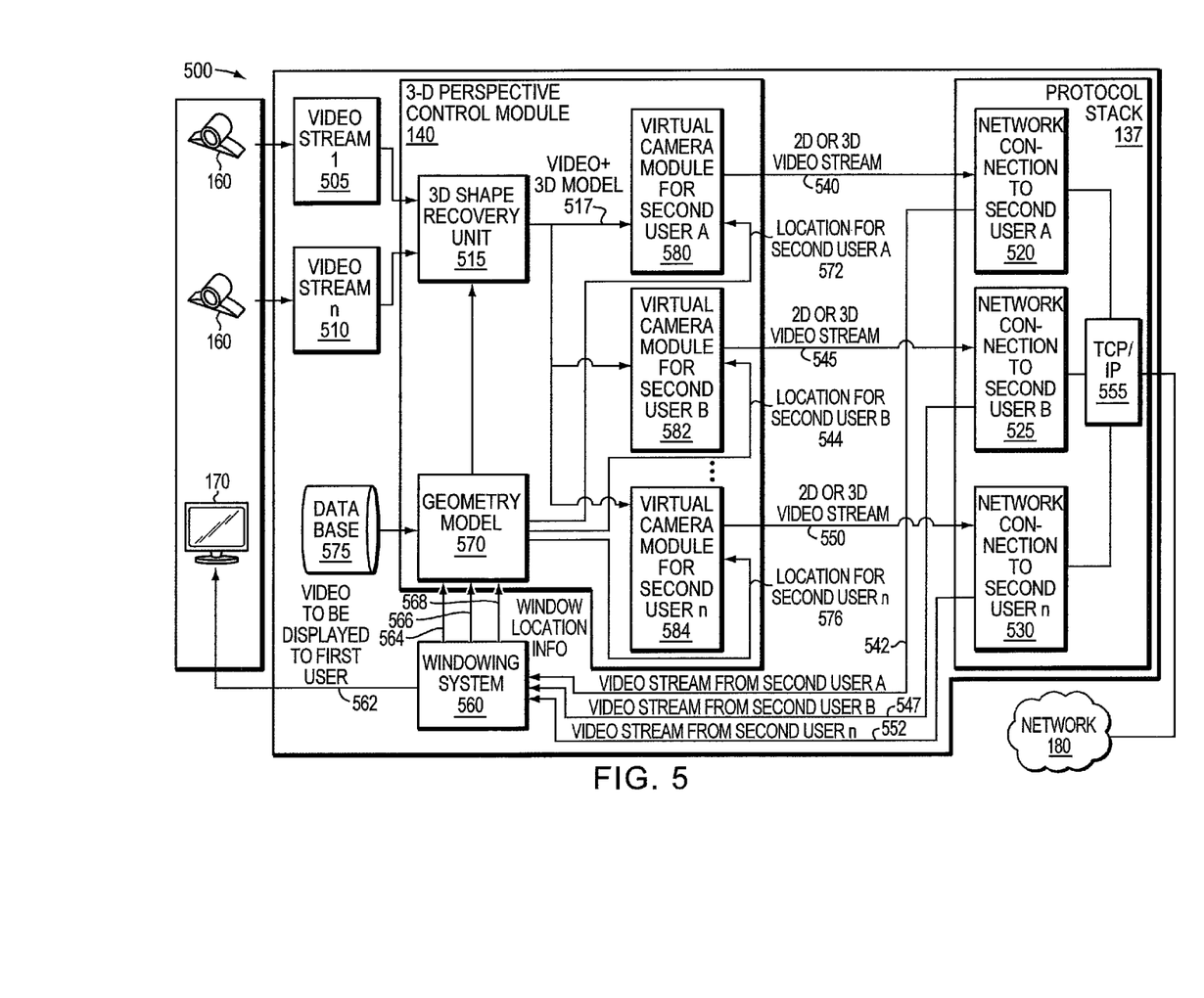
FIG. 5 is an expanded view including an example 3-D perspective control module, and illustrating its interaction with other example software modules and hardware components to produce the views of the first user described above.

FIG. 5 is an expanded view 500 including an example 3-D perspective control module 140, and illustrating its interaction with other example software modules and hardware components to produce the views of the first user described above. One or more physical video cameras 160 (for example, two video cameras) arranged as described above may provide one or more video streams 505, 510 that include images of the first user and his or her surrounding, and depth information for features in the images. The video streams 505, 510 from each camera may be provided as separate streams, or interleaved into a single stream (not shown). Further, the streams 505, 510 may included compressed image data (from any of a variety of compression algorithms) or include uncompressed image data. The one or more video streams are provided to a 3-D shape recovery unit 515 of the 3-D perspective control module 140.

Video streams that include images of each of the one or more second users are also received. For each second user, the protocol stack 137 maintains a network connection 520, 525, 530 that accepts video streams 540, 545, 550 to be transmitted to computing systems used by the respective second users, and receives video streams 542, 547, 552 from the computing systems that include images of the respective second users. The protocol stack 137 may utilize an Internet protocol suite, such the Transmission Control Protocol (TCP)/Internet Protocol (IP) protocol suite 555 to facilitate communication with the remote computing systems over the network 180, for example the Internet.

The received video streams 542, 547, 552 that include images of the respective second users may be passed to a windowing system 560. The windowing system 560 may be a portion of the video conferencing application 135 responsible for arranging each of the streams 542, 547, 552, along with other visual information (not shown) into a video signal 562 to be displayed on the display device 170. Alternatively, the windowing system may be separate from the video conferencing application 135. As discussed above, the windowing system 560 provides the 3-D perspective control module 140 with the locations 564, 566, 568 where each of the images the second users are shown on the display screen 170, for example as x-axis and y-axis coordinates. These locations are utilized by a geometry model 570.

The geometry model 570 may also utilize physical geometry information provided by a database 575. The physical geometry information includes information regarding the location of the one or more physical video cameras (e.g., webcams) 160, for example, with respect to the display screen 170, the size of the display screen 170, the location of the display screen 170, and/or other geometric information. The database 575 may also include calibration information pertaining to the lenses and/or image sensors of the physical video cameras (e.g., webcams) 160. The information in the database 575 may be supplied at manufacture time of the computing system 100, for example, in configurations where the one or more physical video cameras 160 and display screen 170 are integrated with the rest of the computing system as a single component (such as a tablet computer). Alternatively, the information in the database 575 may be propagated upon connection of physical video cameras 160 to the computing system, or upon installation of the video conferencing application 135, for example through download from the physical video cameras 160, download over the network 180, manual entry by the user, or another technique.

Information from the geometry model 570 is provided to the 3-D shape recovery unit 515. The 3-D shape recovery unit 515 combines information obtained from the video streams 505, 510 with the information from the geometry model 570, and using a model generation algorithm generates a 3-D model of the first user and his or her surroundings. Any of a variety of different model generation algorithms may be used, which extract a 3-D model from a sequence of images, dealing with camera differences, lighting differences, and so forth. One example algorithm is described in Pollefreys et al., *Visual modeling with a hand-held camera*, International Journal of Computer Vision 59(3), 207-232, 2004 the contents of which are incorporated by reference herein in their entirety. A number of alternative algorithms are may also be employed. Steps of these algorithms may be combined, simplified, or done periodically, to reduce processing overhead and/or achieve other objectives.

The model generation algorithm may be applied to each video frame to generate a new model each time a frame is captured (e.g., 30 frames per second), or may be applied periodically, at some multiple of video frame capture.

The 3-D model and images of the first user and his or her surroundings are feed in a data stream 517 to virtual camera modules 580, 582, 584, that each render a 2-D (or in some implementations a 3-D) view of the first user from the perspective of a virtual camera associated with a respective second user. Each virtual camera module 580, 582, 584 may position its virtual camera in 3-D space based on information obtained from the geometry model 570, via location signals 572, 574, and 576. Specifically, each virtual camera module 580, 582, 584 may position its virtual camera at a point along a line that extends through the image of the associated second user on the display screen 170 and a location associated with the first user, these locations provided by the geometry model 570. As discussed above, the point on each line at which the respective virtual camera is located may be chosen to be more remote from the first user than the physical video camera(s) (e.g., webcams), for instance, located behind the display screen 170. Each virtual camera module 580, 582, 584 produces a video stream 540, 545, 550 that is sent to the appropriate network connection 520, 525, 530.

Figure 6:
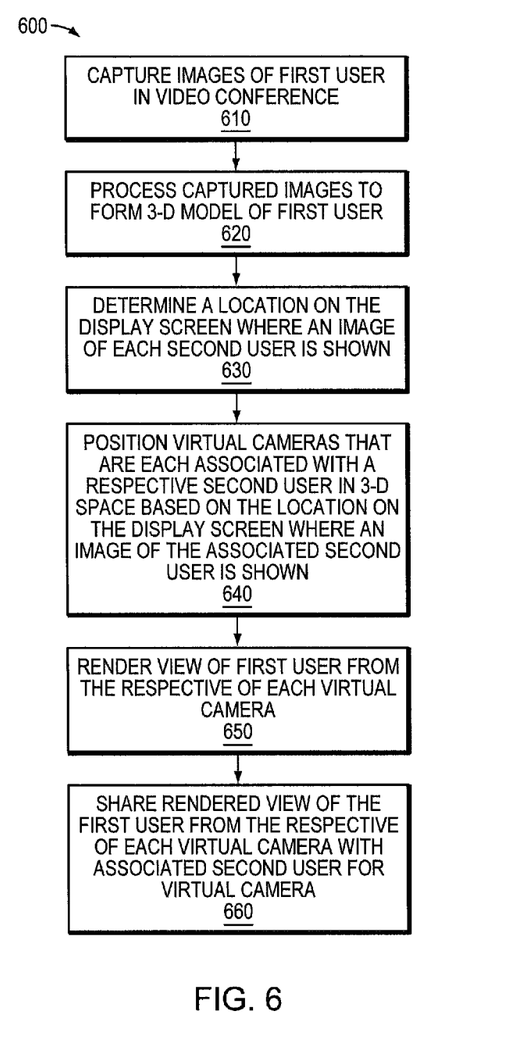
FIG. 6 is a flow diagram of an example sequence of steps for implementing one or more virtual cameras associated with second users in a video conference.

FIG. 6 is a flow diagram of an example sequence of steps for implementing one or more virtual cameras associated with second users in a video conference. At step 610, one or more physical video cameras (e.g., webcams) capture images of a first user in the video conference and his or her surroundings. The images include depth information that indicates the depth of features in the images. At step 620, the captured images and depth information are processed, for example by 3-D shape recovery unit 515 of the 3-D perspective control module 140, to form a 3-D model of the first user and his or her surroundings. At step 630, a location on the display screen is determined where an image of each second user is shown, for example by the windowing system 560. At step 640, one or more virtual cameras that are each associated with a second user participating in the video conference are positioned in 3-D space based on a location on the display screen where an image of the associated second user is shown, for example by a respective virtual camera module 580, 582, 584. For instance, each virtual camera may be positioned at a point along a line that extends through the image of the associated second user on the display screen and a location associated with the first user. The point on each line at which the respective virtual camera is located may be chosen to be more remote from the first user than the physical video camera(s) (e.g., webcams), for instance, located behind the display screen. At step 650, using, for example, the 3-D model and images of the first user and his or her surroundings, a 2-D (or in some implementations a 3-D) view of the first user is rendered from the perspective of each of the one or more virtual cameras, for example, by the virtual camera modules 580, 582, 584. At step 660, the rendered 2-D (or in some implementations 3-D) view of the first user from the perspective of each virtual camera is shared with the associated second user for the respective virtual camera, for example, using network connections 520, 525, 530 provided by the protocol stack 137. When the first user looks to the image of a particular second user on the display screen of their computing device, that second user will see a "head-on" view of the first user and his or her eyes. In such manner, eye contact may be provided to the second user that the first user is looking at. As the attention of first user shifts among second users (if there are multiple ones in the video conference), different second users may see the "head-on" view, as often occurs in a typical "face-to face" conversation as a user's attention shifts among parties.

It should be understood that various adaptations and modifications may be made within the spirit and scope of the embodiments described herein. For example, in some embodiments, the techniques may be used in configurations where some or all of the computing systems used by the one or more second users do not provide a video stream of images of the second user (i.e. a 1-way video conference). In such configurations, the windowing system 560 may display an icon representing the second user, and the respective virtual camera for that second user may be positioned based on the location of the icon, using techniques similar to those described above.

In some embodiments, some or substantially all of the processing may be implemented on a remote server (e.g., in the "cloud") rather than on the computing system 100. For instance, the video streams 505, 510 may be sent directly to the remote server (e.g., to the "cloud") using the protocol stack 137. The functionality of the 3-D shape recovery unit 515, virtual camera modules 580, 582 584 and the like may be implemented there, and a rendered view provided from the remote server (e.g. from the "cloud") to the second user's computing systems. Tasks may be divided between local processing, and processing on the remote server (e.g., in the "cloud") in a variety of different manners.

Likewise, in some embodiments, some or substantially all of the processing may be implemented on the second user's computing systems. For instance, the 3-D model and images of the first user and his or her surroundings of the data stream 517 may be feed, using the protocol stack 137, to the computing systems of the second users. These computing systems may implement, for example, the virtual camera modules. This may allow the second users (or their computing systems) to adjust virtual camera positions. For example, a remote user may be offered a user interface that allows him or her to interactively control the position of their respective virtual camera.

In some embodiments, the first user's attention to the image of a particular second user on the display screen may be recognized and visually highlighted. For instance, the 3-D shape recovery unit 515 may employ a facial recognition routine that recognizes the first user's focus, or the first user can indicate (for example, via a mouse click or other input action) the second user he or she is focused on. The windowing system 700 may then highlight, for example, enlarge the image of that second user, on the display screen 170.

In some embodiments, the above techniques may be employed locally, for example, to implement a virtual minor that allows the first user to check his or her appearance. An image of the first user generated using a virtual camera may be displayed locally on the display screen 170 of the computing system 100. The virtual camera may be position with respect to the image of the first user on the display screen 170, similar to as described above in relation to second user's images. The image of the first user may be rendered as a minor image (i.e. reversed right to left), or as a true image.

In some embodiments, a number of computational shortcuts may be employed to simplify the operations discussed above. For example, explicit construction of a 3-D model may be avoided. For instance, using an image interpolation technique rather than geometry-based modeling, a number of operations may be collapsed together. It should be understood by those skilled in the art that, ultimately, the objective of the computation is to prepare an output datastream with an adjusted viewpoint, and that use of geometry-based modeling is not required. A variety of different techniques may be used to achieve this objective.

Still further, at least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

The invention claimed is:

1. A method for conducting a video conference comprising:

capturing images of a first user in the video conference with one or more physical video cameras;

processing the captured images of the first user to form a three-dimensional (3-D) model of the first user;

determining a location where a face of each of one or more second users in the video conference is shown in images of the one or more second users on the display screen;

positioning one or more virtual cameras in 3-D space, each virtual camera associated with a respective second user and positioned in 3-D space based on the location where the face of the associated second user is shown on the display screen;

rendering a view of the first user from the perspective of each of the one or more virtual cameras; and sharing the rendered view of the first user from the perspective of each virtual camera with the associated second user for the respective virtual camera.

2. The method of claim 1, wherein the positioning comprises:

locating each virtual camera at a point along a line that extends through the face of the associated second user in the image shown on the display screen and a location associated with the first user, such that when the first user looks to the face of the associated second user on the display screen the rendered view of the first user from the perspective of the associated virtual camera will be a head-on view of the first user.

3. The method of claim 2, wherein the point along the line is located more remote from the first user than the one or more physical video cameras.

4. The method of claim 2, wherein the line extends through the location of the face of the associated second user in the image on the display screen and a location of the face of the first user.

5. The method of claim 2, wherein the line extends through a location associated with eyes of the associated second user in the image on the display screen and a location associated with eyes of the first user.

6. The method of claim 1, wherein the one or more second users comprise two or more second users, and the one or more virtual cameras comprise two or more virtual cameras, such that multiple different views of the first user are rendered and shared.

7. The method of claim 1, wherein processing further comprises:

receiving one or more video streams including the captured images; and combining the video streams with physical geometry information, the physical geometry information including information that indicates at least a location of the one or more physical video cameras.

8. The method of claim 1, wherein the location on the display screen where the image of the associated second user is shown includes x-axis and y-axis coordinates of a window on the display screen in which the image of the associated second user is shown.

9. The method of claim 1, wherein the one or more physical video cameras comprise two or more physical video cameras, and the captured images include depth information that indicates depth of features in the captured images.

10. The method of claim 1, wherein the rendered view is a two-dimension (2-D) view.

11. A computing device for conducting a video conference comprising:

one or more physical video cameras configured to capture images of a first user in the video conference;

a display screen configured to display images of one or more second users in the video conference;

a processor configured to execute computer-executable instructions for one or more applications; and a memory configured to store a video conferencing application, the video conferencing application including a three-dimensional (3-D) shape recovery unit configured to process the captured images of the first user to form a 3-D model of the first user, a windowing system including a facial recognition routine configured to determine a location where a face of each of one or more second users in the video conference is shown in images of the one or more second users on the display screen, and one or more virtual camera modules that each implement a virtual camera corresponding to a position in 3-D space, each virtual camera associated with a respective second user and positioned in 3-D space based on the location where the face of the associated second user is shown on the display screen, each virtual camera configured to render a view of the first user from the perspective of the virtual camera, and share the rendered view of the first user from the perspective of the virtual camera with the associated second user for the virtual camera.

12. The computing device of claim 11, wherein each virtual camera is positioned at a point along a line that extends through the face of the associated second user in the image shown on the display screen and a location associated with the first user, such that when the first user looks to the face of the associated second user on the display screen the rendered view of the first user from the perspective of the associated virtual camera will be a head-on view of the first user.

13. The computing device of claim 12, wherein the point along the line is located more remote from the first user than the one or more physical video cameras.

14. The computing device of claim 12, wherein the line extends through the location of the face of the associated second user in the image on the display screen and a location of the face of the first user.

15. The computing device of claim 11, wherein the memory is further configured to store a geometry model that includes physical geometry information that indicates at least a location of the one or more physical video cameras, and the 3-D shape recovery unit is further configured to use the physical geometry information to generate the 3-D model of the first user.

16. A non-transitory computer-readable medium having software encoded thereon that when executed by one or more processors is operable to:

process images of a first user in the video conference captured by one or more physical cameras to form a three-dimensional (3-D) model of the first user;

determine a location on a display screen where an image of each of one or more second users in the video conference is shown to the first user;

position one or more virtual cameras in 3-D space, each virtual camera associated with a respective second user and positioned in 3-D space based on the location on the display screen where the image of the associated second user is shown, each virtual camera positioned at a point in 3-D space that is more remote from a location associated with the first user than each of the one or more physical video cameras is from a location of the first user;

render a view of the first user from the perspective of each of the one or more virtual cameras positioned at the more remote points to simulate a view produced by a telephoto lens; and share the rendered view of the first user from the perspective of each virtual camera with the associated second user for the respective virtual camera.

17. The non-transitory computer-readable medium of claim 16, wherein the point is along a line that extends through the image of the associated second user on the display screen and the location associated with the first user, such that when the first user looks to the image of the associated second user on the display screen the rendered view of the first user from the perspective of the associated virtual camera will be a head-on view of the first user.

18. The non-transitory computer-readable medium of claim 16, wherein the line extends through a location of the face of the associated second user in the image on the display screen and a location of the face of the first user.

19. The non-transitory computer-readable medium of claim 16, wherein the one or more second users comprise two or more second users, and the one or more virtual cameras comprise two or more virtual cameras, such that multiple different views of the first user are rendered and shared.

* * * * *

UNITED STATES PATENT AND TRADEMARK OFFICE
CERTIFICATE OF CORRECTION

| | | |
|---|---|---|
| PATENT NO. | : 8,994,780 B2 | |
| APPLICATION NO. | : 13/645049 | |
| DATED | : March 31, 2015 | |
| INVENTOR(S) | : Terrill M. Moore | |

It is certified that error appears in the above-identified patent and that said Letters Patent is hereby corrected as shown below:

In the Specification:
Col. 10, line 23 should read:
employed locally, for example, to implement a virtual mirror Col. 10, line 30 should read:
images. The image of the first user may be rendered as a mirror Signed and Sealed this
Fourth Day of August, 2015

Michelle K. Lee
*Director of the United States Patent and Trademark Office*